(12) United States Patent
Capolupo et al.

(10) Patent No.: US 11,454,153 B2
(45) Date of Patent: Sep. 27, 2022

(54) ELECTRICAL CONNECTOR FOR A SCR DOSER

(71) Applicant: DELPHI TECHNOLOGIES IP LIMITED, St. Michael (BB)

(72) Inventors: Domenico Capolupo, Gillingham (GB); Simon Coster, Hollingbourne (GB)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 100 days.

(21) Appl. No.: 16/977,863

(22) PCT Filed: Feb. 22, 2019

(86) PCT No.: PCT/EP2019/054494
§ 371 (c)(1),
(2) Date: Sep. 3, 2020

(87) PCT Pub. No.: WO2019/170440
PCT Pub. Date: Sep. 12, 2019

(65) Prior Publication Data
US 2020/0408129 A1    Dec. 31, 2020

(30) Foreign Application Priority Data
Mar. 8, 2018  (GB) ..................... 1803683

(51) Int. Cl.
*H01R 13/17* (2006.01)
*F01N 3/20* (2006.01)
(Continued)

(52) U.S. Cl.
CPC ......... *F01N 3/2066* (2013.01); *F02M 51/005* (2013.01); *H01R 13/17* (2013.01);
(Continued)

(58) Field of Classification Search
CPC .......... F01N 3/2066; F01N 2610/1452; F02M 51/005; H01R 13/17; H01R 13/506;
(Continued)

(56) References Cited

U.S. PATENT DOCUMENTS 4,225,206 A    9/1980  Roman, Jr.
4,900,263 A    2/1990  Manassero et al.
(Continued)

FOREIGN PATENT DOCUMENTS

CN    103443522 A    12/2013
CN    105684225 A    6/2016
(Continued)

OTHER PUBLICATIONS

Second Notification of Office Action from the China National Intellectual Property Administration in Chinese Application No. 201980017566.6, dated Feb. 24, 2022 (with translation).

*Primary Examiner* — Tho D Ta
(74) *Attorney, Agent, or Firm* — Warner Norcross + Judd LLP

(57) ABSTRACT

An electrical connector is provided to be arranged at the end of an electrical cable for complementary connection of an electro-actuator. The connector has a body defining a passage for the cable. The connector also has a hook to mechanically engage with a complementary feature of the electro-actuator.

12 Claims, 4 Drawing Sheets

(51) Int. Cl.
*F02M 51/00* (2006.01)
*H01R 13/506* (2006.01)
*H01R 13/52* (2006.01)
*H01R 13/627* (2006.01)

(52) U.S. Cl.
CPC ....... *H01R 13/506* (2013.01); *H01R 13/5208* (2013.01); *H01R 13/6271* (2013.01); *H01R 13/6273* (2013.01); *F01N 2610/1453* (2013.01)

(58) Field of Classification Search
CPC ............ H01R 13/5208; H01R 13/6271; H01R 13/6273; H01R 13/6275
See application file for complete search history.

(56) References Cited

U.S. PATENT DOCUMENTS

| | | | |
|---|---|---|---|
| 5,129,834 | A | 7/1992 | Cranford |
| 5,318,457 | A | 6/1994 | Harting et al. |
| 7,785,145 | B2 | 8/2010 | Menez |
| 9,771,907 | B2 | 9/2017 | Meek et al. |
| 10,283,908 | B1 * | 5/2019 | Simmons ............. H01R 13/635 |
| 10,527,016 | B2 | 1/2020 | Hagmann et al. |
| 2008/0236147 | A1 * | 10/2008 | Van Vuuren .......... F01N 3/2066 60/286 |
| 2014/0014204 | A1 | 1/2014 | Wright et al. |
| 2014/0054394 | A1 | 2/2014 | Bugos et al. |
| 2014/0273585 | A1 | 9/2014 | Dang |
| 2015/0027108 | A1 * | 1/2015 | Winkler ................ F01N 3/2066 60/295 |

FOREIGN PATENT DOCUMENTS

| | | | | |
|---|---|---|---|---|
| CN | 106785627 A | | 5/2017 | |
| EP | 351083 A | * | 1/1990 | ............. H01R 12/75 |
| FR | 2772996 A1 | | 6/1999 | |
| JP | 0142000 A2 | * | 5/1985 | |
| WO | WO-2014035956 A1 | * | 3/2014 | ............... F01N 3/10 |
| WO | WO-2014048610 A1 | * | 4/2014 | ........... F01N 3/2066 |

\* cited by examiner

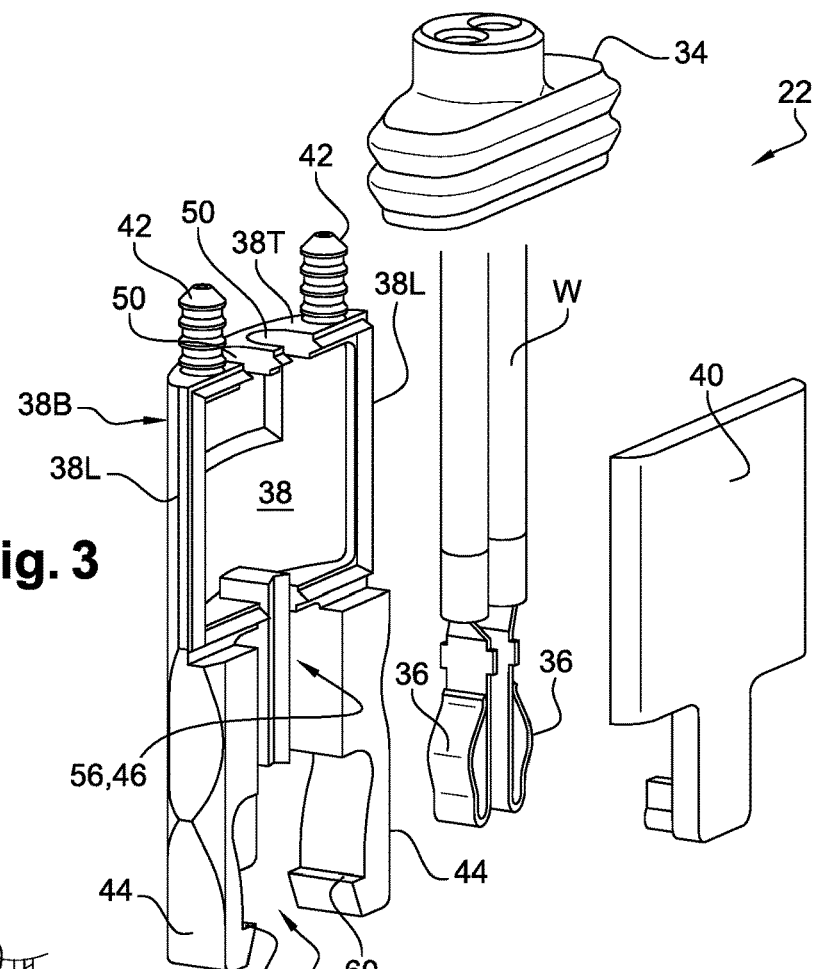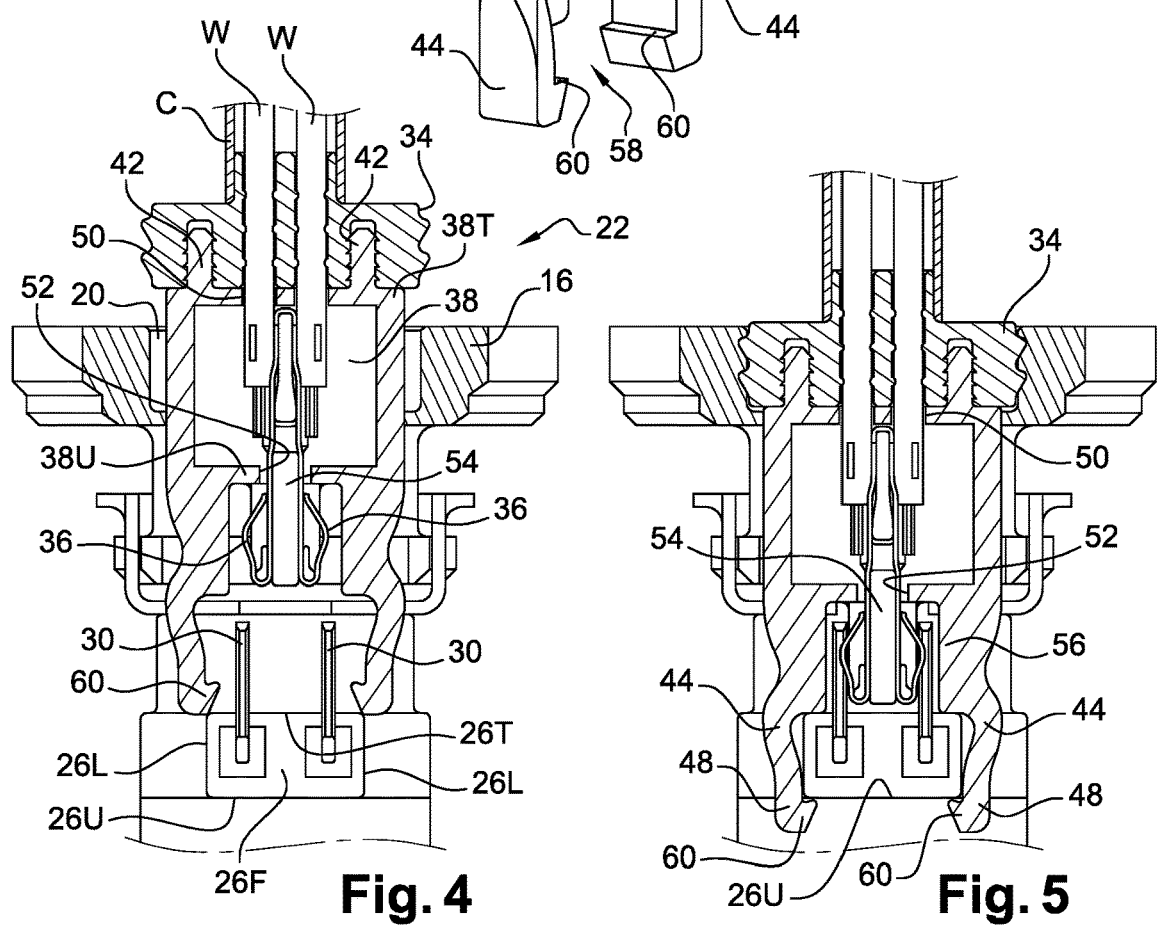

ELECTRICAL CONNECTOR FOR A SCR DOSER

CROSS REFERENCE TO RELATED APPLICATIONS

This application is a national stage application under 35 USC 371 of PCT Application No. PCT/EP2019/054494 having an international filing date of Feb. 22, 2019, which is designated in the United States and which claimed the benefit of GB Patent Application No. 1803683.0 filed on Mar. 8, 2018, the entire disclosures of each are hereby incorporated by reference in their entirety.

TECHNICAL FIELD

The present invention relates to the electrical connection of a reagent fluid doser in the exhaust pipe of an internal combustion engine.

BACKGROUND OF THE INVENTION

In the domain of reagent dosers for Selective Catalytic Reduction (SCR) systems, current concepts for use primarily in the light duty marketplace are formed of an doser that is based on Gasoline Port Fuel Doser technology that is enclosed within some form of housing be it air, or water cooled.

These types of SCR dosers utilize two distinct methodologies of electrical connection.

One concept is to retain the incorporated electrical connector that is part of the doser and leave this connection exposed on the outside of the SCR doser housing. This type of solution is visible in the Continental Patent WO 2014/035956 A1.

The other concept is to directly connect a harness to the connector inside of the housing. There is then an electrical flying lead that protrudes beyond the boundary of the housing and can be connected to the vehicle harness. Such a concept is covered in the Bosch Patent US2015/0027108 A1.

SUMMARY OF THE INVENTION

Accordingly, it is an object of the present invention to resolve the above mentioned problems in providing an electrical connector adapted to be arranged at the end of an electrical cable for complementary connection of an electro-actuator. Said connector has a body and several electrical terminals for electrically connecting pins of said electro-actuator, the body defining a passage for the cable and a recess for arranging the terminals. The connector further comprises a hook adapted to mechanically engage with a complementary feature provided on said electro-actuator thus preventing removal of the connector without damage.

Said hook may be arranged at a resilient end of a spring extending from a base of the connector body and, during engagement of the connector said spring deflects from a rest position and, when the connector is fully engaged said spring self-returns to said rest position.

The spring may comprise a resilient arm.

From said base of the connector body may extend two resilient arms defining said spring.

Said base may define a box with peripheral walls closed by a lid. The cable passage may comprise at least one hole and an opening provided through said wall.

The electro-actuator may be arranged in a body provided with an aperture for inserting the connector body, said connector further comprising a seal member adapted to seal said aperture once the connector is fully inserted. Said seal member is adapted to seal both around the cable and around the connector body and, it may be further provided with a locating feature complementary engaged with the connector body.

The invention further extends to the electro-actuator that comprises an overmoulded coil from the outer face of which protrudes a block wherefrom extends electrical pins adapted to be in electrical contact with the terminals of a connector as previously described, the hook engaging said block.

Said block may be a cuboid from a face of which extends said pins.

The invention extends to a doser adapted for spraying a fluid, said doser having a body enclosing an electro-actuator, the body being provided with an aperture enabling insertion of an electrical connector as previously described in order to connects said electro-actuator.

The doser may be adapted to be arranged on the exhaust pipe of an internal combustion engine for spraying therein a reagent fluid.

The doser body may comprise a cylindrical wall extending along a main axis between a front nozzle and a rear wall provided with said aperture for the connector insertion.

The doser body the electro-actuator may be arranged so that the pins are at about mid-distance between the rear wall the front nozzle.

Said aperture may be elongated.

BRIEF DESCRIPTION OF THE DRAWINGS

The present invention is now described by way of example with reference to the accompanying drawings in which:

FIG. 3 is an exploded view of the electrical connector of FIG. 1.

FIGS. 4 and 5 a two frontal axial section of the doser presenting a pre-insertion stage and a full insertion stage of the connector.

DESCRIPTION OF THE PREFERRED EMBODIMENTS

Figure 1:
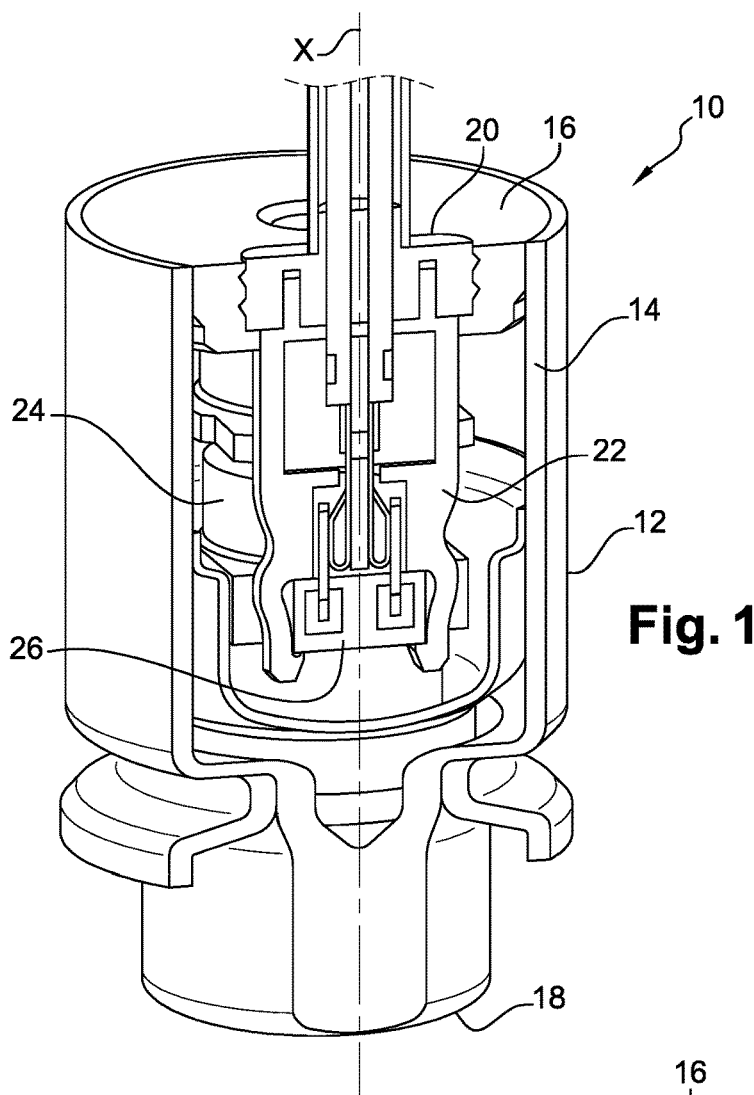
FIG. 1 is doser with a cut away to enable vision of the electric connector as per the invention.
Figure 2:
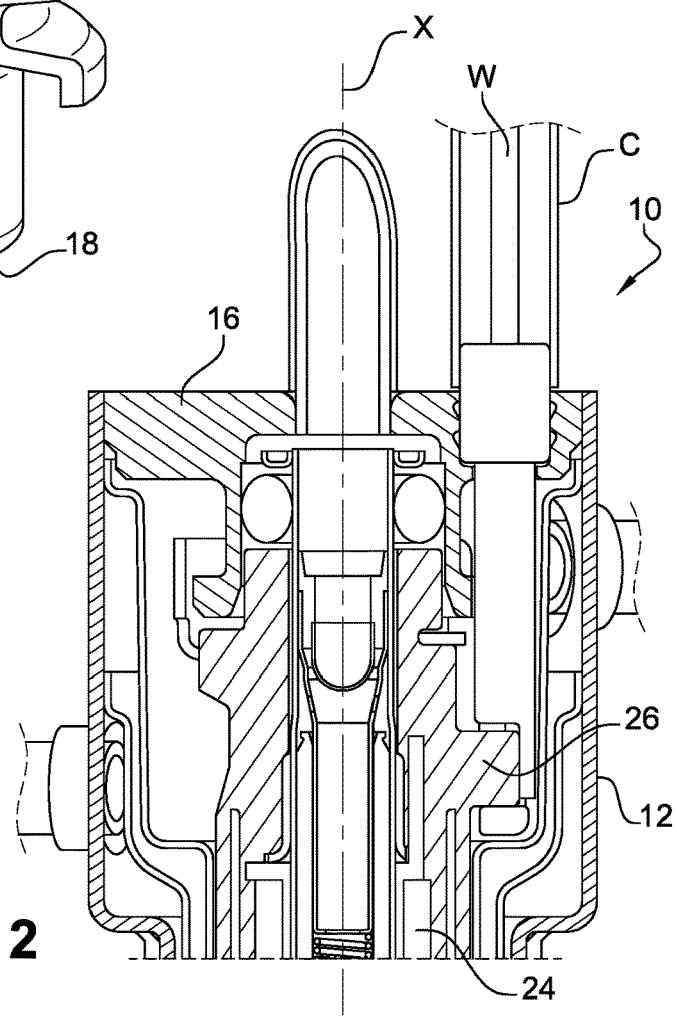
FIG. 2 is a section of the doser of FIG. 1 with a side view of the electric connector.

In reference to the figures is described an electrical connection of a SCR doser 10, said doser having a can-shaped body 12 comprising a cylindrical wall 14 extending along a main axis X between a rear wall 16 and a front wall defining a spray nozzle 18. Said rear wall 16 is provided with a reagent inlet for enabling reagent fluid, such as urea water, to enter the injector body 12 and to flown therein toward the nozzle 18 wherefrom it is sprayed in an exhaust pipe of the engine. The rear wall is also provided with an aperture 20 for insertion of an electrical connector 22.

The body 12 encloses an electro-actuator 24 cooperating with a valve member that alternatively enables or prevent said spray of reagent, said electro-actuator 24 enclosing a solenoid within an overmoulded encapsulation integrally provided with a connection block 26 protruding from the cylindrical lateral 28 face of the encapsulation. Two electrical pins 30 protrude from said block and extend toward the aperture 20 provided in the rear wall 16. As shown, said connection block 26 is a cuboid with a rectangular front face 26F, two opposed lateral faces 26L and, a top face 26T opposed to an under face 26U.

Through said aperture 20 is inserted the electrical connector 22 fixed at the end of an electrical cable C having two insulated wires W. The connector 22 comprises a body 32, a sealing grommet 34 and two electrical spring terminals 36, each one being crimped at the end of one of said wire W.

The connector body 32 is a plastic molded part comprising a crimping box 38 having a front opening covered and closed by a lid 40 and, extending from said box 38 are integrally moulded two positioning index 42 and two arms 44 defining a connection portion 46 and a snap-hook 48.

The crimping box 38 has a top wall 38T wherefrom extend said two positioning index 42 for positioning and holding the grommet 34, an under wall 38U wherefrom extend said arms 44, two laterals walls 38L, a back wall 38W and said lid 40 defining a front wall.

The wires W enter said box 38 via two holes 50 provided in the top wall 38T in-between the positioning index 42 and, on the opposite side the two terminals 36 exit the box 38 via an opening 52 centrally provided in the under wall 38U in-between the arms 44, the crimping portion of the terminals onto the ends of the wires W being housed inside the box 38 and, shortcuts are prevented by keeping the terminals 42 apart from one another by a partition wall 54 integral to the lid 40.

The two arms 44 extend from the opposed lateral ends of the box under wall 38U, said arms 44 being symmetrical in shape and substantially parallel to one another defining between themselves a space comprising a rectangular recess 56 in which opens said opening 52 and wherein are arranged the terminals 36 and, a wider downward portion 58.

Around the rectangular recess 56, the arms 44 are relatively thick and therefore fairly stiff. their elasticity is minimal. Around the wider downward portion 58, the arms 44 are thinner and have an enhanced elasticity, thus defining a spring that naturally rests in a rest position, when not being solicited and that, self-returns to said rest position when forced away from it and then released. Each arm defines at its end a spur 60, or a fish-hook, defining oriented toward the opposite arm, said spurs 60 defining together said snap-hook 48. Each of said spur 60 have a sloped outer face 62 distant from one another by a hook opening HO that is slightly smaller than the width between the lateral faces 26L of the cuboid connection block 26. As shown on FIG. 4, as the connector engages, said sloped outer faces 62 get in contact with the corners between the lateral faces 26L and the top face 26T of the connection block 26. Further engaging the connector, the arms 44 move apart and the ends of said spurs 60 slide against the lateral faces 26L. As the arms fully enclose the connection block 26 in said wider portion 58, the spurs 60 reach the under face 26U and resiliently move back toward one another and hook the connector to the electro-actuator 24.

In said hooked position shown in FIG. 5, the pins 40 extend in the rectangular recess 56 between the arms, forcing the spring terminals 36 to compress and ensuring the electrical connection between the actuator, the pins, the terminals and the wires.

Figure 6:
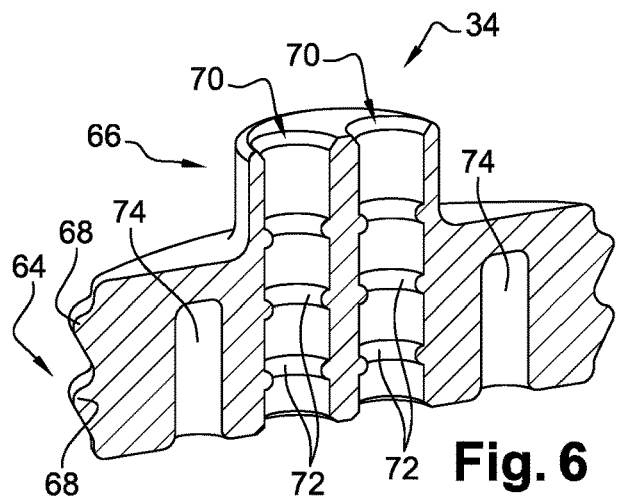
FIG. 6 is a section view of a grommet of the connector.
Figure 7:
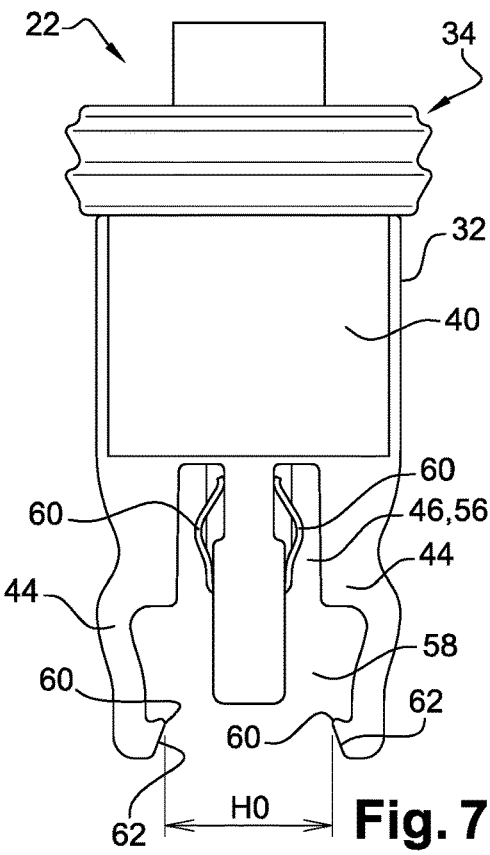
FIG. 7 is a view of the complete connector.
Figure 8:
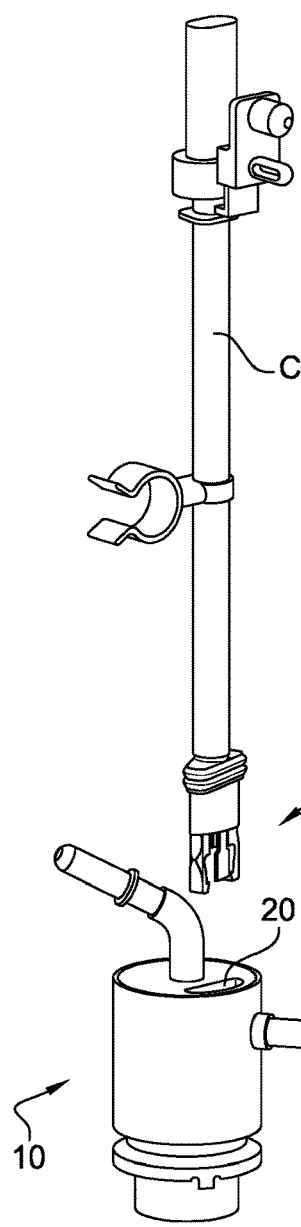
FIG. 8 is a large 3D view presenting the pre-connection stage of the doser.
Figure 9:
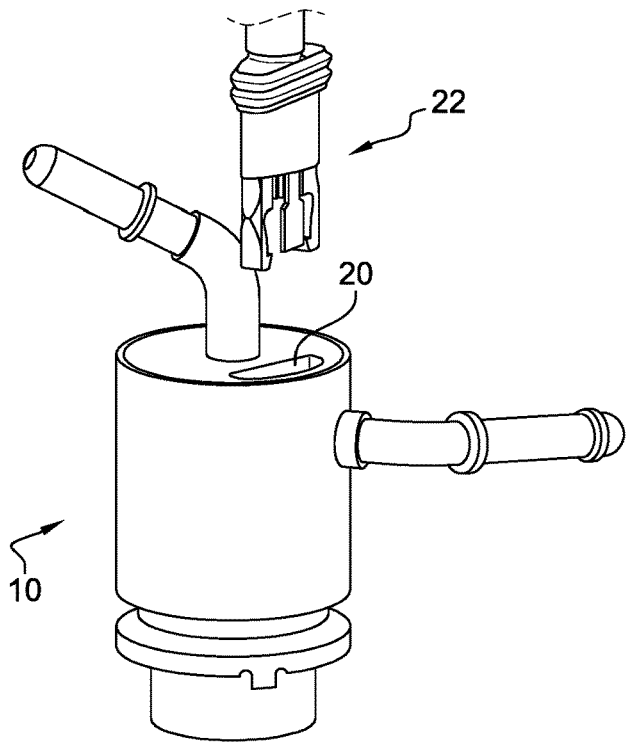
FIG. 9 is a magnified view of FIG. 8.
Figure 10:
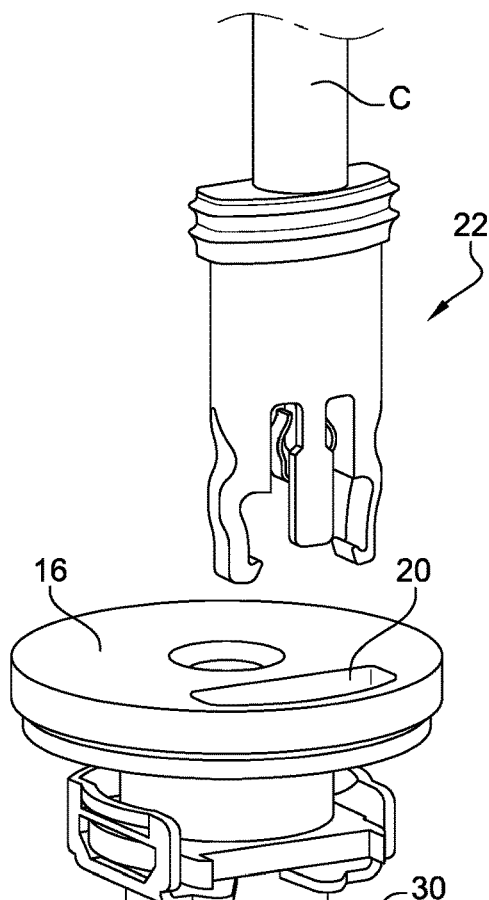
FIGS. 10, 11 and 12 present three stages of the insertion of the connector.
Figure 11:
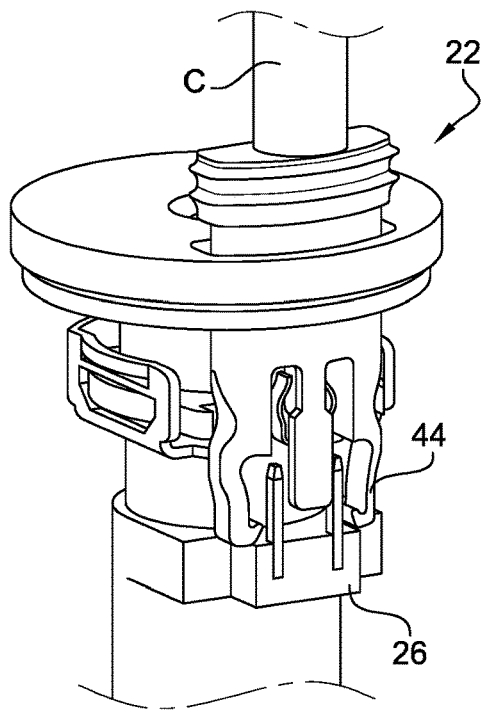
Figure 12:
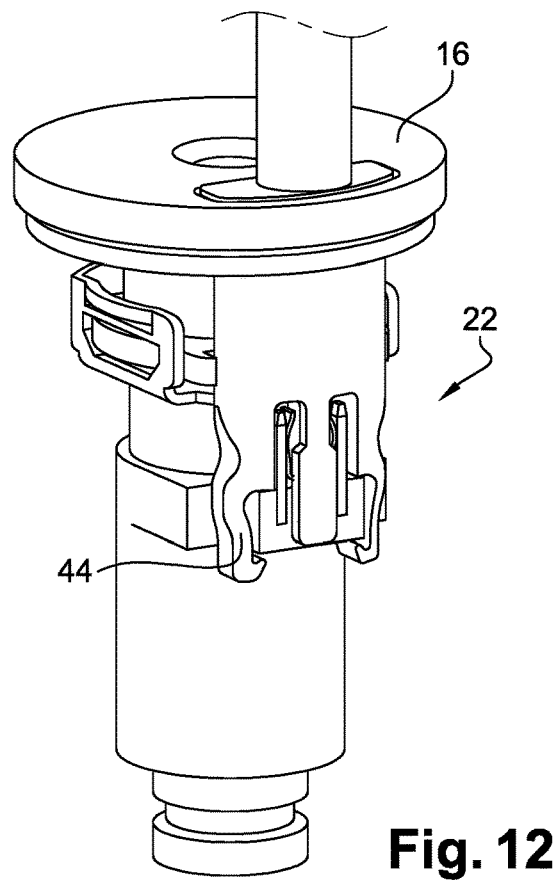

Opposite to the snap-hook 48, the grommet 34 ensures sealing of the aperture 20 through which the connector is engaged. Said grommet 34, particularly shown on FIGS. 6 and 7 is made with a rubber-like material having a main base portion 64 shaped for complementary engagement in the aperture 20 and from which extends a turret portion 66 arrange to seal around the wires W. The base 64 is provided with peripheral annular ribs 68, two being shown on FIG. 6, that are deformed and squeezed against the peripheral wall of the opening 20 when engaging said base in the aperture 20 and thus, sealing said aperture preventing water, or any fluid, to enter the doser body 12 though said outer passage.

Through the base 64 and the turret 66 also extend two through passages 70 for the wires W, said passages being also provided with annular ribs 72 deformed and squeezed when the wires W are engaged in said through passage 70 preventing fluid to enter the doser body around the wires.

Moreover, the base portion 64 is provided with two blind holes 74 for insertion of the positioning index 42 of the connector.

Thanks to this arrangement the actuator pins 30 are arranged at a distance from the rear portion of the doser where the rear wall 16, that is a thick plate, is welded to the cylindrical wall, the heat generated during said welding operation potentially damaging the electrical connection. The connector 22 is easily engaged through the aperture 20, the grommet ensuring total sealing of the aperture 20.

Once fully engaged, the snap-hook 48 closes as the spurs 60 engage the under face 26U of the connection block 26. Moreover, said under face 26U can be provided with complementary grooves, not represented, for receiving said spurs once clipped. In said closed position electrical connection of the actuator is established and the connector cannot be removed. The snap-hook 48 prevents disengagement and removal of the connector 22 without exerting forces that would damage permanently the electrical connection, for instance that would tear off the wires or brake the arms.

In another alternative not represented, the lid 40 which downwardly extends defining said partition wall 54 ensuring separation of the terminals inside and outside the box 38, can be further provided at its end with a similar snap-hook that would slide against the front face 26F of the connection block 26 before engaging the under face 26U.

LIST OF REFERENCES

X main axis
C cable
W wire
HO hook opening
10 doser
12 body
14 cylindrical wall
16 rear wall
18 front nozzle
20 aperture
22 electrical connector
24 electro-actuator
26 connection block
26F front face
26L lateral face
26T top face
26U under face 28 lateral face
30 pins
32 connector body
34 grommet
36 terminals
38 box
38T top wall
38U under wall
38L lateral walls
38B back wall
40 lid
42 positioning index
44 arms
46 connection portion
48 snap-hook
50 holes
52 opening
54 partition wall
56 rectangular recess
58 wider portion
60 spur
62 outer face
64 grommet base portion
66 turret
68 peripheral ribs
70 wire passages
72 annular ribs
74 blind location holes

The invention claimed is:

1. An electrical connector adapted to be arranged at an end of an electrical cable for complementary connection of an electro-actuator including pins protruding from a connector block, said electrical connector comprising:
a connector body and a plurality of electrical terminals for electrically connecting the pins of said electro-actuator, the connector body defining a passage for the electrical cable and a recess which arranges the plurality of electrical terminals;
the connector body further comprising a base and two opposing resilient arms extending from said base, said resilient arms defining a space therebetween; and
a hook configured to mechanically engage with the connector block;
wherein said space comprises said recess and a downward portion for receiving the connector block, said downward portion being adjacent and continuous with said recess and being wider than said recess;
wherein each resilient arm defines at its end a spur oriented toward the opposite arm and having a sloped outer face configured such that a distance between the opposing outer faces is smaller than a width of the connector block, the spurs defining said hook;
wherein during engagement of the electrical connector to the electro-actuator, said resilient arms deflect from a rest position and when the electrical connector is fully engaged, said resilient arms self-return to said rest position.

2. An electrical connector as claimed in claim 1, wherein said base defines a box with peripheral walls closed by a lid.

3. An electrical connector as claimed in claim 2, wherein said passage comprises at least one hole and an opening provided through said peripheral walls.

4. An electrical connector as claimed in claim 1, wherein said electro-actuator is arranged in an electro-actuator body provided with an aperture for inserting the connector body, the electrical connector further comprising a seal member configured to seal said aperture once the electrical connector is fully inserted.

5. An electrical connector as claimed in claim 4, wherein the seal member is adapted to seal both around the electrical cable and around the connector body.

6. An electrical connector as claimed in claim 4, wherein said seal member is further provided with a locating feature complementary engaged with the connector body.

7. An electro-actuator comprising:
an overmoulded coil from an outer face of which protrudes a block wherefrom extends a plurality of electrical pins in electrical contact with a plurality of terminals of an electrical connector, said electrical connector comprising;
a connector body and a plurality of electrical terminals for electrically connecting the pins of said electro-actuator, the connector body defining a passage for an electrical cable and a recess which arranges the plurality of electrical terminals;
the connector body further comprising a base and two opposing resilient arms extending from said base, said resilient arms defining a space therebetween; and
a hook mechanically engaged with said block;
wherein said space comprises said recess and a downward portion for receiving the block, said downward portion being adjacent and continuous with said recess and being wider than said recess;
wherein each resilient arm defines at its end a spur oriented toward the opposite arm and having a sloped outer face configured such that a distance between the opposing outer faces is smaller than a width of the block, the spurs defining said hook;
wherein during engagement of the electrical connector to the electro-actuator, said resilient arms deflect from a rest position and when the electrical connector is fully engaged, said resilient arms self-return to said rest position.

8. An electro-actuator as claimed in claim 7 wherein said block is a cuboid from a face of which extends said plurality of electrical pins.

9. A doser adapted for spraying a fluid, said doser having a body enclosing an electro-actuator including pins protruding from a connector block, the body being provided with an aperture enabling insertion of an electrical connector, the electrical connector comprising:
a connector body and a plurality of electrical terminals for electrically connecting the pins of said electro-actuator, the connector body defining a passage for an electrical cable and a recess which arranges the plurality of electrical terminals;
the connector body further comprising a base and two opposing resilient arms extending from said base, said resilient arms defining a space therebetween; and
a hook configured to mechanically engage with the connector block;
wherein said space comprises said recess and a downward portion for receiving the connector block, said downward portion being adjacent and continuous with said recess and being wider than said recess;
wherein each resilient arm defines at its end a spur oriented toward the opposite arm and having a sloped outer face configured such that a distance between the opposing outer faces is smaller than a width of the connector block, the spurs defining said hook;
wherein during engagement of the electrical connector to the electro-actuator, said resilient arms deflect from a rest position and when the electrical connector is fully engaged, said resilient arms self-return to said rest position.

10. A doser as claimed in claim 9 configured to be arranged on an exhaust pipe of an internal combustion engine for spraying therein a reagent fluid.

11. A doser as claimed in claim 9, wherein the doser body comprises a cylindrical wall extending along a main axis between a front nozzle and a rear wall provided with said aperture for insertion of the electrical connector.

12. A doser as claimed in claim 11, wherein in the doser body is arranged so that the pins are at about mid-distance between the rear wall the front nozzle.

\* \* \* \* \*